United States Patent
Machuca et al.

(10) Patent No.: US 11,722,762 B2
(45) Date of Patent: Aug. 8, 2023

(54) FACE TRACKING DUAL PREVIEW SYSTEM

(71) Applicant: MOTOROLA MOBILITY LLC, Chicago, IL (US)

(72) Inventors: Fabio Felipe Mira Machuca, Sao Paulo (BR); Boby Iyer, Elmhurst, IL (US); Rahul B. Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 491 days.

(21) Appl. No.: 17/066,417

(22) Filed: Oct. 8, 2020

(65) Prior Publication Data

US 2022/0070363 A1 Mar. 3, 2022

Related U.S. Application Data

(60) Provisional application No. 63/073,438, filed on Sep. 1, 2020.

(51) Int. Cl.
| | |
|---|---|
| *H04N 23/611* | (2023.01) |
| *G06T 7/246* | (2017.01) |
| *H04N 5/262* | (2006.01) |
| *G06F 3/14* | (2006.01) |
| *G06V 40/16* | (2022.01) |
| *H04N 23/53* | (2023.01) |
| *H04N 23/63* | (2023.01) |
| *H04N 23/51* | (2023.01) |

(52) U.S. Cl.
CPC ......... *H04N 23/611* (2023.01); *G06F 3/1423* (2013.01); *G06T 7/246* (2017.01); *G06V 40/166* (2022.01); *H04N 5/2628* (2013.01); *H04N 23/531* (2023.01); *H04N 23/632* (2023.01); *G06T 2207/20132* (2013.01); *G06T 2207/30201* (2013.01); *H04N 23/51* (2023.01)

(58) Field of Classification Search
None
See application file for complete search history.

(56) References Cited

U.S. PATENT DOCUMENTS

| | | | |
|---|---|---|---|
| 9,241,102 B2 * | 1/2016 | Bala | H04N 23/683 |
| 9,591,210 B2 * | 3/2017 | Sen | H04N 23/62 |
| 11,004,223 B2 * | 5/2021 | Jakubiak | G06T 5/50 |

(Continued)

OTHER PUBLICATIONS

Zeng, Hui, et al., Reliable and Efficient Image Cropping: A Grid Anchor Based Approach, arXiv:1904.04441v1 [cs.CV], Apr. 9, 2019.

(Continued)

*Primary Examiner* — Toan H Vu
(74) *Attorney, Agent, or Firm* — Isidore PLLC

(57) ABSTRACT

An electronic device, computer program product, and method perform face tracking within an image stream captured by an image capturing device for preview on a second display device. At least one first display device presents a first preview image of the image stream via a first graphical user interface (GUI). The first GUI has a first aspect ratio. A controller of the electronic device tracks a primary face of a subject within the image stream. A second display device presents a second preview image via a second GUI. The controller generates the second preview image from the first preview image by cropping around the primary face to a second aspect ratio of the second GUI.

19 Claims, 8 Drawing Sheets

(56) References Cited

U.S. PATENT DOCUMENTS

| | | | |
|---|---|---|---|
| 11,055,049 B1* | 7/2021 | Peuhkurinen | G06F 3/1438 |
| 2015/0058754 A1* | 2/2015 | Rauh | H04N 1/00 |
| | | | 715/753 |
| 2015/0318020 A1* | 11/2015 | Pribula | H04N 21/2743 |
| | | | 386/290 |
| 2018/0335901 A1* | 11/2018 | Manzari | G06F 3/0482 |
| 2020/0260015 A1* | 8/2020 | An | H04N 23/45 |
| 2020/0311803 A1* | 10/2020 | Maxilom | G06V 20/20 |
| 2021/0105356 A1* | 4/2021 | Yu | G06F 3/04883 |
| 2021/0357034 A1* | 11/2021 | Trinh | G06F 1/1652 |
| 2021/0400142 A1* | 12/2021 | Jorasch | H04M 3/567 |
| 2021/0405865 A1* | 12/2021 | Faulkner | H04N 7/147 |

OTHER PUBLICATIONS

Santella, Anthony, et al., "Gaze-Based Interaction for Semi-Automatic Photo Cropping", ACM 1-59593-178-3/06/0004—Apr. 2006.

Cavalcanti, Claudio S.V.C., et al., Combining Multiple Image Features to Guide Automatic Portrait Cropping for Rendering Different Aspect Ratios, 978-0-7695-4319 IEEE—2010.

* cited by examiner

FACE TRACKING DUAL PREVIEW SYSTEM

CLAIM OF PRIORITY UNDER 35 U.S.C. § 119

The present application for patent claims priority to Provisional Application No. 63/073,438 entitled "Face Tracking Dual Preview Device" filed 1 Sep. 2020 and assigned to the assignee hereof and hereby expressly incorporated by reference herein.

1. TECHNICAL FIELD

The present disclosure relates generally to digital image capturing devices, and more particularly with digital imaging capturing devices that present a preview image.

2. DESCRIPTION OF THE RELATED ART

Electronic devices such as smartphones are often used to take pictures and videos. Conventional camera-enabled smartphones use a main display to present a camera preview to the user. Generally, the field of view of camera is automatically oriented and sized for the main display, giving the user useful cues to aim the camera for capturing a picture. Image capturing devices that utilize facial recognition technology have become common, enabling certain focusing features to be incorporated for taking portraits. However, unless the user is taking a "selfie" with a front side camera, a subject of the picture does not have the benefit of the camera preview provided by the main display. The subject is not automatically assisted in positioning and posing for the picture. The user of the smartphone has to verbally coach the subject of the picture.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
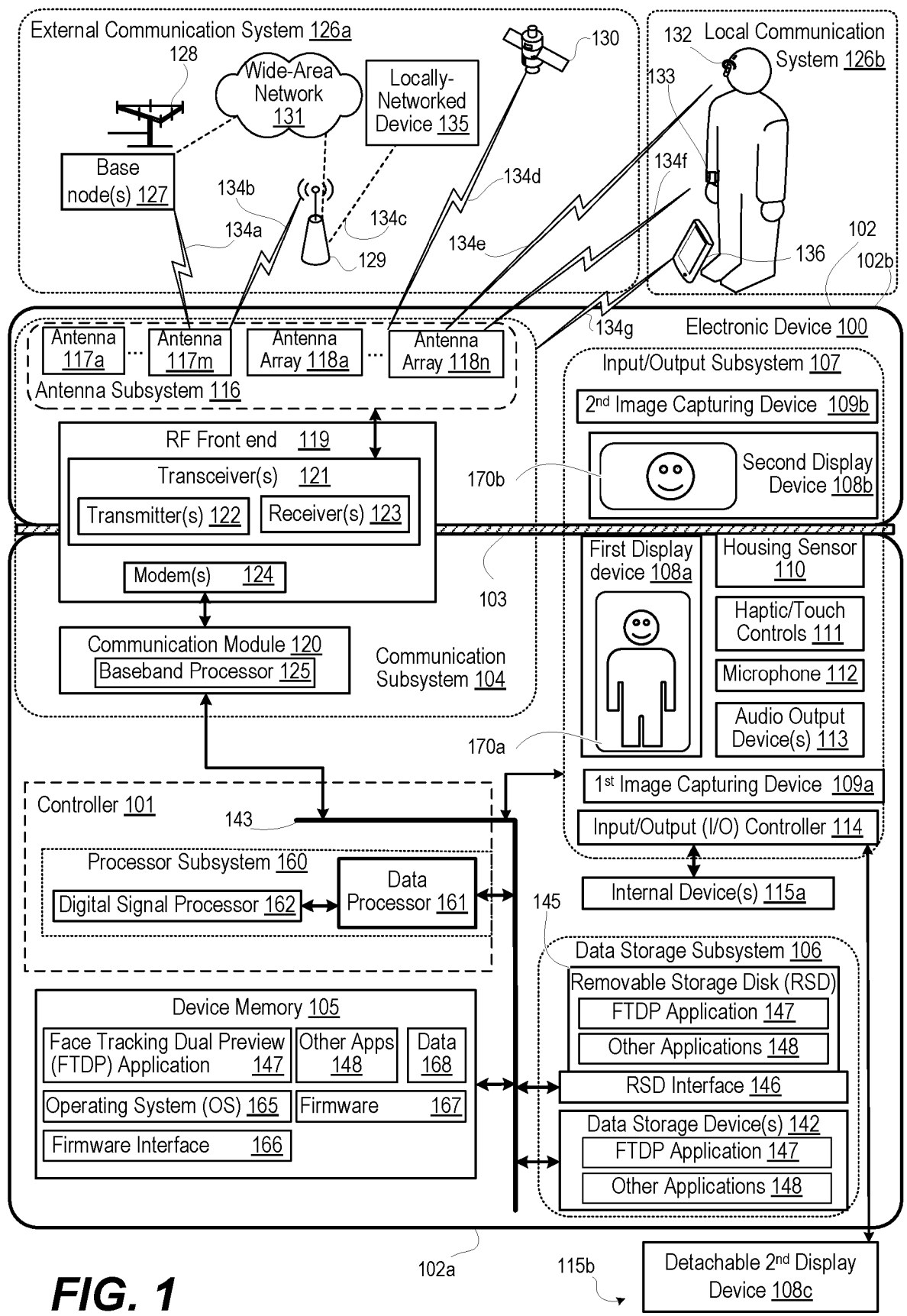
FIG. 1 depicts a functional block diagram of an electronic device that operates as a communication device in a communication environment and within which the features of the present disclosure are advantageously implemented, according to one or more embodiments.

According to aspects of the present disclosure, an electronic device, computer program product, and method use a second display device to provide an appropriately cropped camera preview for a subject of an image capturing event. The electronic device includes a housing having a front side and a back side. At least one first display device presents a first graphical user interface (GUI). The at least one first display is on the front side of the housing. The first GUI has a first aspect ratio and a first size. The second display device presents a second GUI that has a second aspect ratio that is different from the first aspect radio and that has a second size that is smaller than the size of the first GUI. The electronic device includes an image capturing device that generates an image stream. A controller of the electronic device is communicatively coupled to the first and the second display devices and to the image capturing device. The controller receives the image stream from the image capturing device. The controller presents, via the first GUI, a first preview image of the image stream. The controller identifies and tracks a primary face of a subject within the image stream. The controller presents, via the second GUI, a second preview image of the image stream that is cropped around the primary face to fit the second aspect ratio to compensate for the different size and/or different aspect ratio of the second GUI.

In one or more embodiments, the electronic device has a primary display that has an aspect ratio that is matched to an aspect ratio of the image capturing device. Accordingly, cropping of the image preview on the primary display is not necessary. The image preview on the primary display is an appropriate identical representation of the image stream, which can be recorded or transmitted for presentation on other devices. In one or more alternate embodiments, the electronic device has one or more cameras or camera settings that can generate different aspect ratios. For example, the camera sensor of the image capture device can be configured to capture a square picture view, a letter box view, a panoramic view, and a standard landscape/portrait view, each view having different aspect ratios and/or dimensions. Aspects of the present disclosure can be applied to enable the controller to generate different previews of the captured image on the single primary display with meaningful selection of subject content for image preview based on the aspect ratio of the primary display relative to the aspect ratio of the captured image stream.

In one or more embodiments, the present innovation recognizes and makes use of an opportunity provided by the electronic device having, or being communicatively connect to, a second display device. In one embodiment, the second display device is oriented toward a subject of an image capturing event. Some electronic devices have a flip phone form that closes to reduce the longitudinal length of the device and to protect a first display device that is a main display. Certain display capabilities are maintained in the closed position by having a small second display device on a back side of the electronic device. A user typically looks at the larger main display when the electronic device is in the open position, such as to take a picture using an image capturing device. The user gets the benefit of a first image preview on the first display device to compose the picture with proper aim and magnification. The smaller second display device can be used to provide a second image preview that benefits the subject.

However, the aspect ratios of the first and second display devices are generally different. For example, a main display can have an aspect ratio of 3:4, 9:16 or 9:21 and a second display device can have an aspect ratio of 4:3. A large number of hand-held, portable user electronic devices, such as cellular phones, are configured with an elongated form factor, with opposed front and back surfaces. A main display encompasses all or most of one surface of the electronic device. When the electronic device is held horizontally, the main display presents a landscape orientation. When the electronic device is held vertically, the main display presents a portrait orientation along the longitudinal axis, extending from top to bottom of the device. The second display device of these devices is smaller and is transverse to the longer longitudinal axis of the electronic device. Thus, when the main display is held in portrait orientation, the second display device is presented in a landscape or a squared orientation. Two generally known approaches are used to present an image having a first aspect ratio on a display device that has a different aspect ratio than the image. A first approach to image previewing is reducing the size of the image so that an entirety of the image fits on the display. Black bars bracket the small image. Although the entire image is presented in this first approach, an image reduced in size on a small display can be too small for the subject to infer anything meaningful from the image preview. In addition, a substantial portion of the display is not used to present the image. A second approach to image previewing is to size the image so that the entire display device is used, cropping off the portion of the image that does not fit. The portion that remains is larger but does not necessarily show a region of interest. For example, the subject may be off-center in the portion that is cropped.

In one or more embodiments, the present disclosure provides automatic cropping of the image that utilizes face tracking to identify a primary face within the image. Once a primary face is identified, the electronic device automatically crops an image around the primary face. Thus, the present innovation improves an electronic device with a first display device that is used as a main or primary display and a second display device that has a different aspect ratio to the first display. The electronic device presents a camera image preview on the second display that crops and centers around the likely regions of interest so that the presented image preview minimizes the presentation of non-viewable picture area that is otherwise displayed when converting to a differently scaled aspect ratio and orientation. Embodiments of the present innovation are applicable to various configurations of electronic devices such as those with a foldable form factor and those with peripherally attachable second displays.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device 100 in an operating environment within which the features of the present disclosure are advantageously implemented. In particular, electronic device 100 is presented as a communication device, which is managed by controller 101. According to one aspect, electronic device 100 is a mobile or hand-held device having housing 102, which in one or more embodiments has a flip phone form. Housing 102 includes base housing 102a and movable housing 102b that are coupled for movement by pivotable coupling mechanism 103. Housing 102 is positionable between an open position and a closed position. The closed position is also referred to as folded. While electronic device 100 is presented as a communication device, electronic device 100 can include no communication capabilities, in one or more embodiments. In addition, it is appreciated that the features describe herein are fully applicable to various types of communication and non-communication devices, and that the presentation of electronic device 100 as a communication device is solely as an example and not meant to be limiting on the disclosure. Electronic device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. As a device supporting wireless communication, electronic device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In one or more embodiments, electronic device 100 includes communication subsystem 104, device memory 105, data storage subsystem 106, and input/output (I/O) subsystem 107. Each subsystem (104, 106, and 107) is managed by controller 101. I/O subsystem 107 has user interface devices that include first and second display devices 108a-108b. I/O subsystem 107 includes front side and back side image capturing devices 109a-109b and housing sensor 110. I/O subsystem 107 can include other user interface devices such as touch/haptic controls 111, microphone 112, and audio output device(s) 113. I/O subsystem 107 also includes I/O controller 114, which connects to internal devices 115a that are internal to housing 102 and peripheral devices 115b, such as a detachable second display device 108c that are external to housing 102 of electronic device 100. Examples of internal devices 115a are computing, storage, communication, or sensing components depicted within housing 102 that do not support direct connection to other components of electronic device 100.

Communication subsystem 104 includes antenna subsystem 116 having lower band antennas 117a-117m and higher band arrays antenna arrays modules 118a-118n. Communication subsystem includes radio frequency (RF) front end 119 and communication module 120. RF front end 119 has transceiver(s) 121, which includes transmitter(s) 122 and receiver(s) 123. RF front end 119 further includes modem(s) 124. Communication module 120 of communication subsystem 104 has baseband processor 125. Baseband processor 125 communicates with controller 101 and RF front end 119. Baseband processor 125 operates in baseband frequency range to encode data for transmission and decode received data, according to a communication protocol. Modem(s) 124 modulate baseband encoded data from communication module 120 onto a carrier signal to provide a transmit signal that is amplified by transmitter(s) 122. Modem(s) 124 demodulates each signal received from external communication system 126a detected by antenna subsystem 116. The received signal is amplified and filtered by receiver(s) 123, which demodulate received encoded data from a received carrier signal.

In one or more embodiments, controller 101, via communication subsystem 104, performs multiple types of over-the-air (OTA) or wireless communication with external communication system 126a. External communication system 126a can include devices such as base node(s) 127 elevated on respective radio tower(s) 128, access node(s) 129, and global positioning system (GPS) satellites 130. Some of these devices can be communicatively coupled to at least one wide area network 131. Communication subsystem 104 communicates via OTA communication channel(s) 134a with base node 127. Communication subsystem 104 communicates via wireless communication channel(s) 134b with access node 129. In one or more particular embodiments, access node 129 supports communication using one or more IEEE 802.11 wireless local area network (WLAN) protocols. Access node 129 is connected to wide area network 131, such as the Internet. In one or more particular embodiments, communication subsystem 104 communicates with one or more locally networked devices 135 via wired or wireless link 134c provided by access node 129. Communication subsystem 104 receives downlink broadcast channel(s) 134d from GPS satellites 130 to obtain geospatial location information.

In one or more embodiments, local communication system 126b includes wireless headset 132 and smart watch 133 that are coupled to electronic device 100 to form a personal access network (PAN). Communication subsystem 104 communicates via low power wireless communication channel(s) 134e with headset 132. Communication subsystem 104 communicates via second low power wireless communication channel(s) 134f, such as Bluetooth, with smart watch 133. In one or more particular embodiments, communication subsystem 104 communicates with other communication device(s) 136 via wireless link 134g to form an ad hoc network.

Data storage subsystem 106 of electronic device 100 includes data storage device(s) 142. Controller 101 is communicatively connected, via system interlink 143, to data storage device(s) 142. Data storage subsystem 106 provides nonvolatile storage that is accessible by controller 101. For example, data storage subsystem 106 can provide a selection of applications such as facial tracking dual preview (FTDP) application 147 and other application(s) 148 that can be loaded into device memory 105. In one or more embodiments, data storage device(s) 142 can include hard disk drives (HDDs), optical disk drives, and/or solid-state drives (SSDs), etc. Data storage subsystem 106 of electronic device 100 can include removable storage device(s) (RSD(s)) 145, which is received in RSD interface 146. Controller 101 is communicatively connected to RSD 145, via system interlink 143 and RSD interface 146. In one or more embodiments, RSD 145 is a non-transitory computer program product or computer readable storage device. Controller 101 can access RSD 145 or data storage device(s) 142 to provision electronic device 100 with program code, such as facial tracking dual preview (FTDP) application 147 and other applications 148. When executed by controller 101, the program code causes or configures electronic device 100 to provide the functionality described herein.

Controller 101 includes processor subsystem 160, which includes one or more central processing units (CPUs), depicted as data processor 161. Processor subsystem 160 can include one or more digital signal processors 162 that are integrated with data processor 161 or are communicatively coupled to data processor 161, such as baseband processor 125. In one or embodiments that are not depicted, controller 101 can further include distributed processing and control components that are peripheral or remote to housing 102 or grouped with other components, such as I/O subsystem 107. Data processor 161 is communicatively coupled, via system interlink 143, to device memory 105. In one or more embodiments, controller 101 of electronic device 100 is communicatively coupled via system interlink 143 to communication subsystem 104, data storage subsystem 106, and input/output subsystem 107. System interlink 143 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 143) are illustrated in FIG. 1, it is to be understood that more, fewer, or different interconnections may be present in other embodiments.

Controller 101 manages, and in some instances directly controls, the various functions and/or operations of electronic device 100. These functions and/or operations include, but are not limited to including, application data processing, communication with other electronic devices, navigation tasks, image processing, and signal processing. In one or more alternate embodiments, electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard-wired logic.

Device memory 105 includes applications such as FTDP application 147, and other application(s) 148. Device memory 105 further includes operating system (OS) 165, firmware interface 166, such as basic input/output system (BIOS) or Uniform Extensible Firmware Interface (UEFI), and firmware 167. Device memory 105 includes data 168 used by FTDP application 147, and other application(s) 148. Processor subsystem 160 of controller 101 executes program code to provide operating functionality of electronic device 100. These software and/or firmware modules have varying functionality when their corresponding program code is executed by processor subsystem 160 or secondary processing devices within electronic device 100. Processor subsystem 160 of controller 101 can execute program code of FTDP 147 to provide an improved camera preview for a subject of an image capturing event.

In the exemplary embodiment, first display device 108*a* of I/O subsystem 107 is fully exposed in the open position and at least partially hidden in the closed position, such as by being attached to a front side of housing 102. First display device 108*a* presents a first GUI 170*a* of a first size and a first aspect ratio. The first aspect ratio can indicate landscape or portrait orientation. Second display device 108*b* of I/O subsystem 107 remains visible in both the open and the closed positions. Second display device 108*b* presents a second GUI 170*b*. Second GUI 170*b* is a second size that is smaller than the first size of first GUI 170*a* and has a second aspect ratio that is different from first GUI 170*a*. The second aspect ratio can indicate landscape or portrait orientation, which can be respectively transverse to the orientation of first GUI 170*a*. First image capturing device 109*a* is connected to the front side of housing 102 and can be used for taking "selfie" pictures and for other purposes such as gesture and facial recognition or video calling. Second image capturing device 109*b* is connected to the back side of housing 102 and can be used for other image capturing events. Controller 101 configures I/O subsystem 107, based at least in part on whether housing sensor 110 detects that housing 102 is in the open position or the closed position. For example, controller 101 can activate display devices 108*a*-108*b* and image capturing devices 109*a*-109*b* in response to the position detected by housing sensor 110. Housing sensor 110 can utilize mechanical, capacitive, inductive, and/or resistive sensing to detect a position of housing 102.

For clarity, electronic device 100 is described as having two displays: first display device 108*a* and second display device 108*b*. In one or more embodiments, electronic device 100 can have more than one second display device 108*b*.

Figure 2:
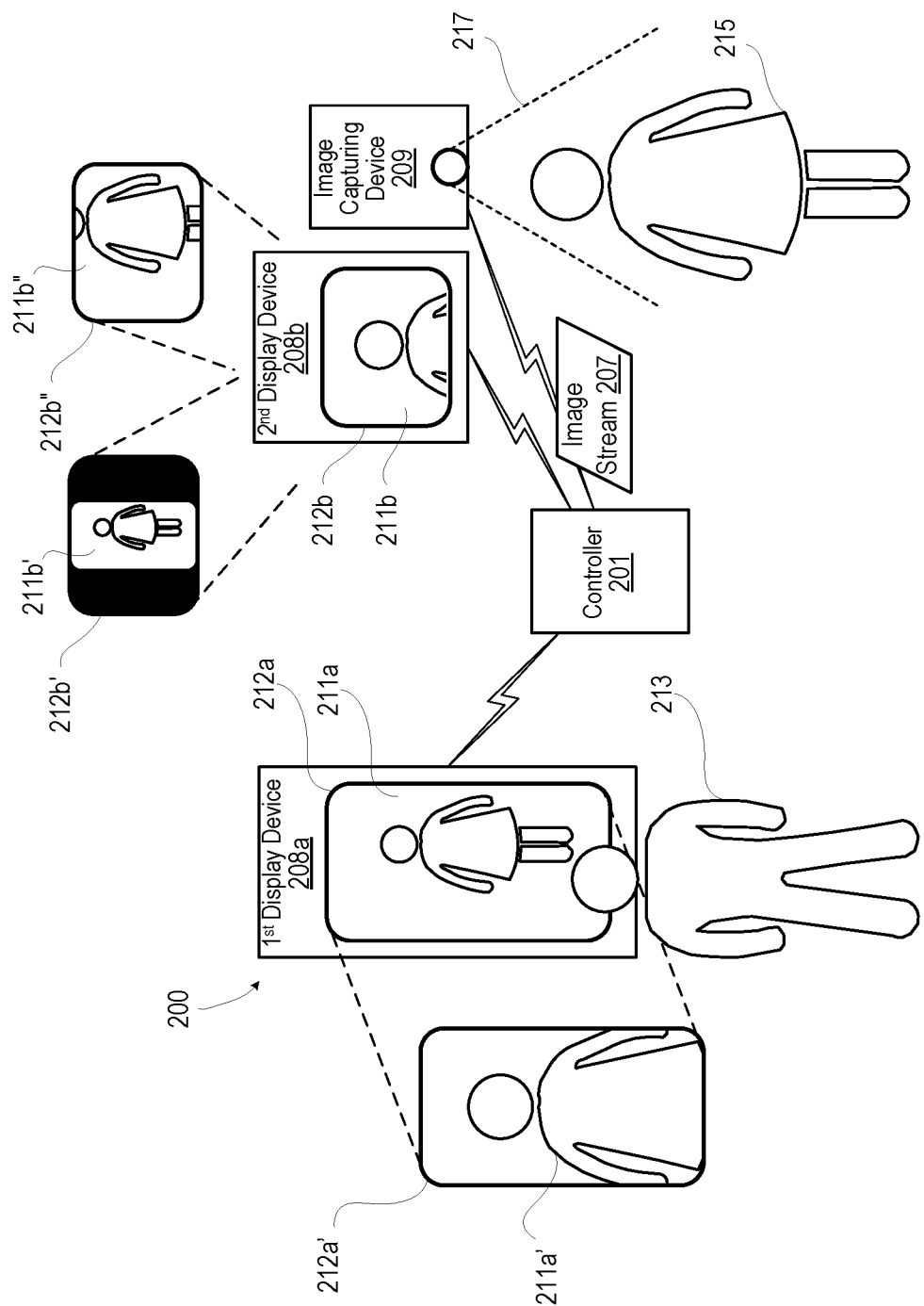
FIG. 2 depicts an example distributed system implementation in which a controller of the system performs face tracking within an image stream captured by an image capturing device for preview on a second display device, according to one or more embodiments.

FIG. 2 depicts a functional block diagram of example distributed system 200. For clarity, components of distributed system 200 are depicted separately, but communicatively coupled. In one or more embodiments, distributed system is an integrated architecture that provides a single electronic device. In one or more embodiments, such as illustrated by FIG. 2, distributed system 200 includes physically separated components that are communicatively coupled to operate as a system having a distributed architecture. Distributed system 200 has first and second display devices 208*a*-208*b*. In one or more embodiments, distributed system 200 includes similar or identical components are electronic device 100 (FIG. 1). Distributed system 200 includes image capturing device 209 that has a field of view of a space in front of second display 208*b*. Image capturing device 209 generates image stream 207. Controller 201 of distributed system 200 is configured or programmed to perform face tracking of a subject's face presented within the image stream. In one or more embodiments, controller 201 executes FTDP application 147 and other application(s) 148 (FIG. 1) to enable distributed system 200 to perform aspects of the present disclosure described herein. Controller 201 provides, on first and second displays 208*a*-208*b*, dual preview of an image stream from image capturing device 209. Controller 201 presents first image preview 211*a* via first GUI 212*a* on first display device 208*a* for viewing by user 213.

In at least one embodiment, first display device 208a has a size relative to the distance to user 213 that enables presenting of the full height and width of image stream 207. In one or more embodiments, image capturing device 209 provides image stream 207 in an aspect ratio that matches the aspect ratio of first display device 208a. Subject 215 is within field of view (FOV) 217 of image capturing device 209. Controller 201 presents second image preview 211b via second GUI 212b on second display device 208b. Subject 215 can view second display device 208b, which is oriented toward subject 215. Second display device 208b has second GUI 212b that has a different aspect ratio than first GUI 212a of first display device 208a. In some instances, the size of the person displayed on second GUI 212b relative to the distance to subject 215 is too small for subject 215 to infer meaningful information. This is particularly true if second image preview 211b is scaled down (equally in both X and Y dimensions) to fit entirely in second GUI 212b. This scenario is depicted in reconfigured second GUI 212b', which presents uncropped second image preview 211b'. Alternate reconfigured second GUI 212b" depicts center-cropped second image preview 211b" without the benefit of face tracking.

Returning to GUI 212b, controller 201 automatically face tracks subject 215 and crops second image preview 211b around the face of subject 215. Only the cropped second image preview 211b, showing the more important detail from the original image stream, is presented on second display device 208b. Cropping based on face tracking mitigates the problems inherent with arbitrary, automatic copping or resizing of the image stream on second GUI 212b. In one embodiment, user 213 can select another type of image preview 211a' on reconfigured GUI 212a', such as a magnified view to be shown on first display device 208a.

In one or more embodiments, controller 201 automatically tracks an anatomical feature such as a head, a head and torso, a full body, facial features of one or more of eyes, nose and mouth and ears, etc. In one or more embodiments, controller 201 tracks anatomical features particular to recognizing a specific subject, such as performing geometric facial recognition of the subject. In one or more embodiments, controller 201 performs face tracking that identifies an outer shape appropriately sized and proportioned to be a human face without recognizing an identity of the subject.

An example of a use of a distributed architecture for distributed system 200 includes an identification screening station where an individual is imaged for security purposes. Subject 215 can infer cues from second GUI 212b to adjust position for facial recognition. User 213 can monitor the appearance of the entire person for purposes of capturing a full body picture. Another example of a use of a distributed architecture for distributed system 200 includes user 213 recording a video blog of subject 215. User 213 is interested in monitoring the video image stream as being recorded or transmitted. Subject 215 benefits from getting real-time feedback about facial expressions and eye contact. An additional example of a use of a distributed architecture for distributed system 200 includes a photography studio that is digitally photographing noncompliant subjects such as children or pets. Subject 215 can benefit from the second GUI 212b prompting eye contact with image capturing device 209.

Figure 3A:
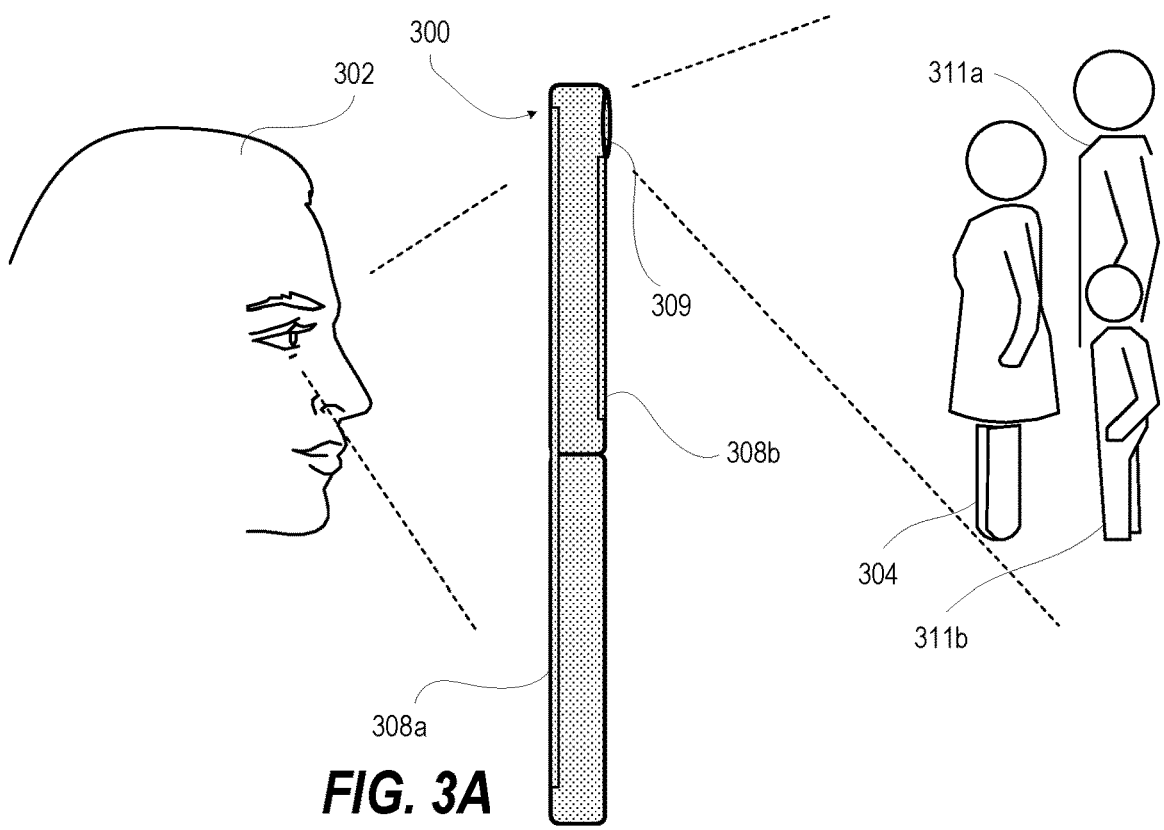
FIG. 3A depicts a side view of an example electronic device having a symmetric flip phone form and that is being used for capturing an image of a subject, according to one or more embodiments.

FIG. 3A depicts a side view of example electronic device 300 having a symmetric flip phone form and that is being used by user 302. In one or more embodiments, electronic device 300 includes similar or identical components are electronic device 100 (FIG. 1). In one or more embodiments, electronic device 300 includes controller 101 that executes FTDP application 147 and other application(s) 148 (FIG. 1) to enable electronic device 300 to perform aspects of the present disclosure described herein. User 302 views first display device 308a on a front side of electronic device 300. Subject 304 is able to view second display device 308b on a back side of electronic device 300. Subject 304 is closer to image capturing device 309 than other people 311a-311b.

Figure 3B:
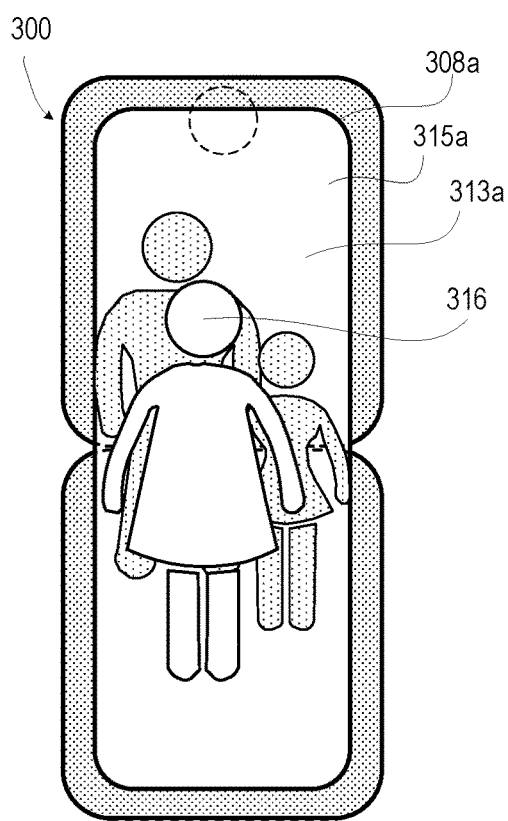
FIG. 3B depicts a front side view of the example electronic device of FIG. 3A having a first display device presenting a first image preview, according to one or more embodiments.

FIG. 3B depicts a front side view of example electronic device 300 having first display device 308a presenting first image preview 313a via first GUI 315a. First image preview 313a is cropped around subject 304. Other people 311a-311b are positioned by subject 304. Electronic device 300 performs face tracking of subject 304 and other people 311a-311b who may be captured within the image stream. In one or more embodiments, facial tracking can identify an intentional grouping of faces. For example, facial tracking can detect that all faces are close together and facing the electronic device, inferring an intentional grouping of faces. Electronic device 300 can select a group of faces as the subject. In one or more embodiments, electronic device 300 selects one face as the subject.

Figure 3C:
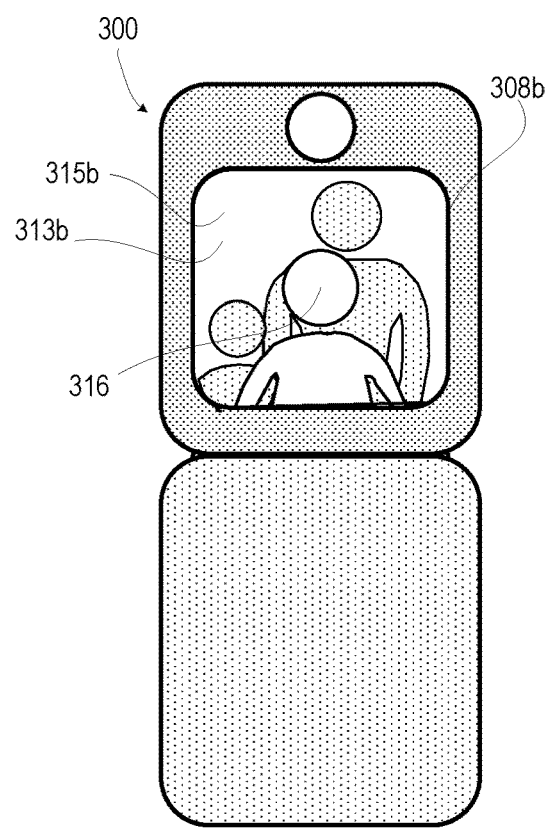
FIG. 3C depicts a back side view of the example electronic device of FIG. 3A having a second display device presenting a second image preview that is cropped around a primary face, according to one or more embodiments.

FIG. 3C depicts a back side view of example electronic device 300. Electronic device 300 identifies subject 304 using face tracking as being primary face 316 for cropping of second image preview 313b that is presented via second GUI 315b on second display device 308b. Face tracking can identify one or more of (i) which face is largest, (ii) which person is closer to electronic device 300, (iii) which face is user-selected as subject 304, (iv) which face is recognized by electronic device 300 as predefined subject 304, and (v) which person appears to be subject 304 based on the expectation that the user implements directional aiming of image capturing device 209 toward subject 304. For example, the user can aim the image capturing device 309 to follow subject 304. In one or more embodiments, second image preview 313b is horizontally rotated so that subject 304 sees a mirror image, which is a more intuitive way to view the image.

Figure 4A:
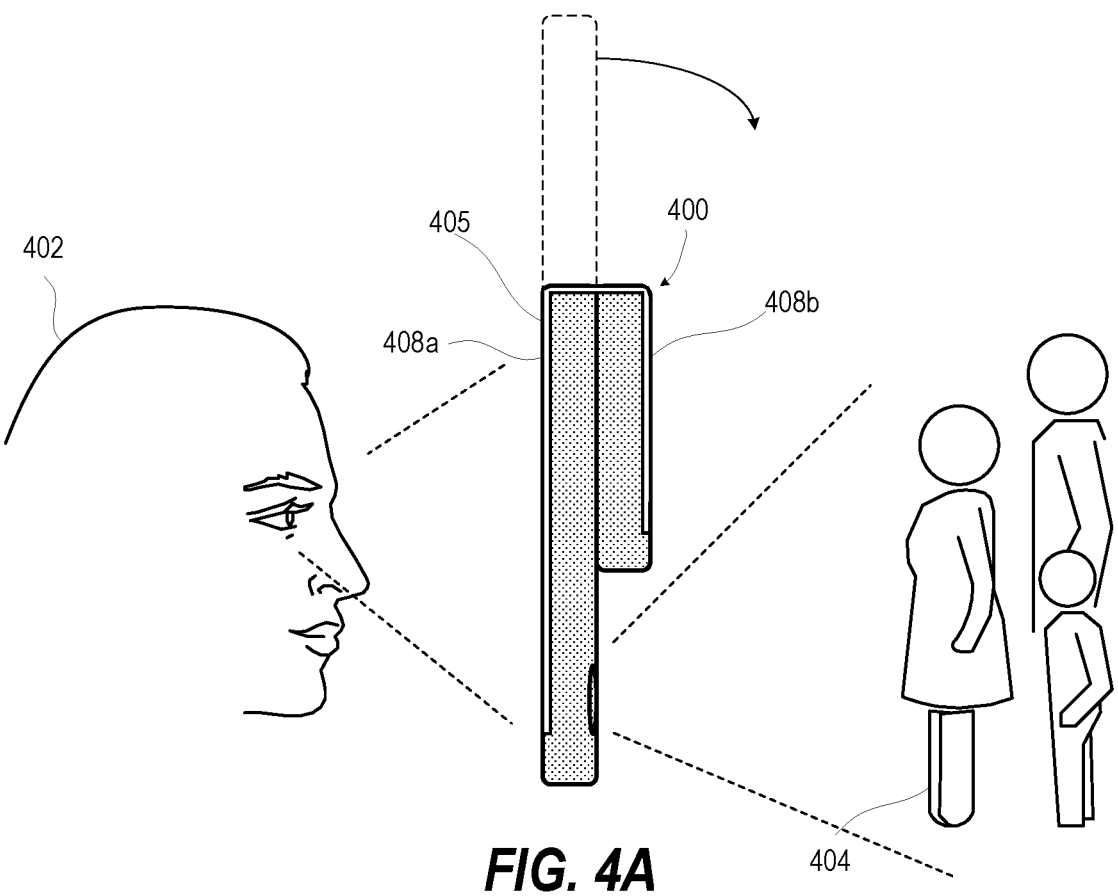
FIG. 4A depicts a side view of an example electronic device having an asymmetric flip phone form and that is being used for capturing an image of a subject, according to one or more embodiments.

FIG. 4A depicts a side view of example electronic device 400 having an asymmetric flip phone form and that is being used by user 402 for capturing an image of subject 404. In one or more embodiments, electronic device 400 includes similar or identical components are electronic device 100 (FIG. 1). In one or more embodiments, electronic device 400 includes controller 101 that executes FTDP application 147 and other application(s) 148 (FIG. 1) to enable electronic device 400 to perform aspects of the present disclosure described herein. In one or more embodiments, electronic device presents unitary foldable display 405 that is longitudinally elongate when electronic device 400 is in an open position. In one or more embodiments, the aspect ratio of the captured image stream is too narrow to present the image stream of image capturing device 409 without cropping, stretching, or leaving part of the display 405 unused. Folding of electronic device 400 enables user 402 to view first display device 408a of unitary foldable display 405 that remains oriented toward a front side and user 402. A portion of unitary foldable display 405 is repurposed as second display device 408b by being oriented toward a back side of electronic device 400 and toward subject 404.

Figure 4B:
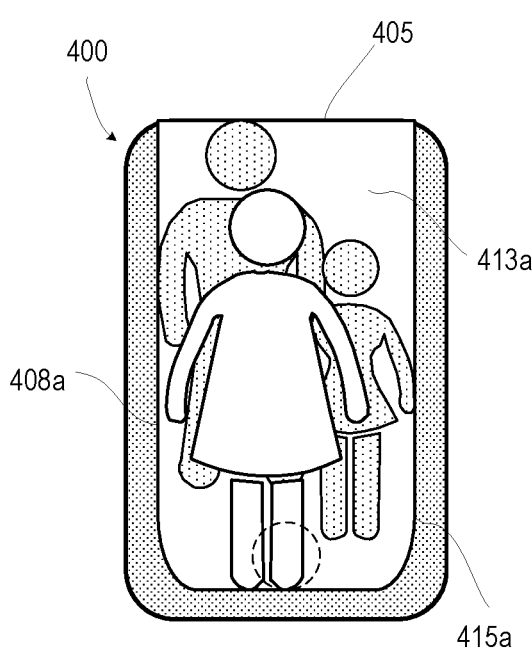
FIG. 4B depicts a front side view of the example electronic device of FIG. 4A having a first display device that is a front side portion of a foldable display presenting a first image preview, according to one or more embodiments.

FIG. 4B depicts a front side view of example electronic device 400 having first display device 408a of unitary foldable display 405 that has a corresponding aspect ratio for presenting uncropped first preview image 413a via first GUI 415a. The folded down position of example electronic device 400 can also provide a more convenient carrying size.

Figure 4C:
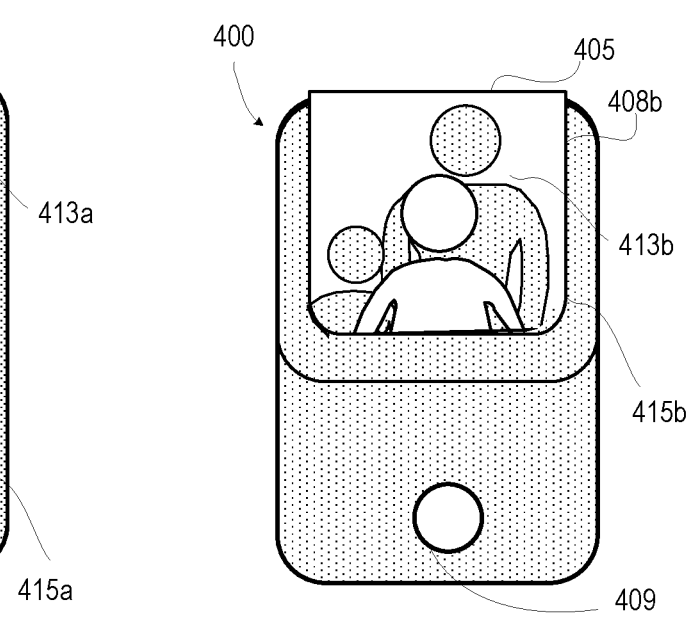
FIG. 4C depicts a back side view of the example electronic device of FIG. 4A having a second display device that is a back side portion of the foldable display presenting a second image preview that is cropped around a primary face, according to one or more embodiments.

FIG. 4C depicts a back side view of example electronic device 400 having second display device 408b of unitary foldable display 401 that has a different aspect ratio appropriate for presenting cropped second preview image 413b via second GUI 415b. Image capturing device 409 is exposed in both open and closed positions of electronic device 400.

Figure 5A:
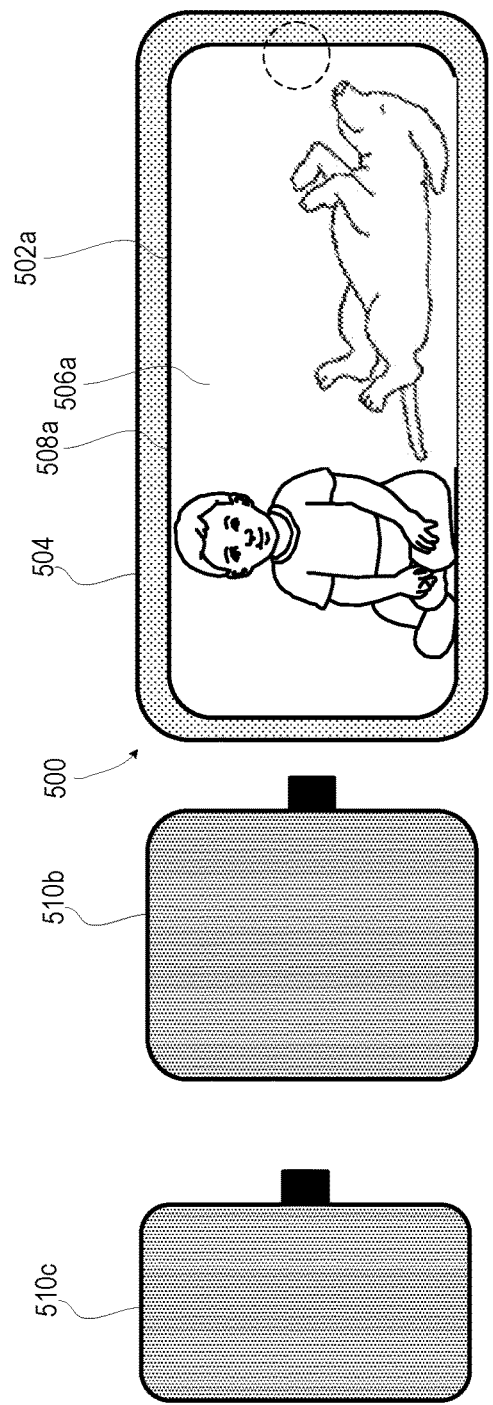
FIG. 5A depicts a front side view of an example electronic device having a first display device presenting a first image preview and having a detached peripheral device with different aspect ratios from the first display device, according to one or more embodiments.

FIG. 5A depicts a front side view of example electronic device 500 that has a candy bar form and a single display device 502a on a front side of housing 504. In one or more embodiments, electronic device 500 includes similar or identical components are electronic device 100 (FIG. 1). In one or more embodiments, electronic device 500 includes controller 101 that executes FTDP application 147 and other application(s) 148 (FIG. 1) to enable electronic device 500 to perform aspects of the present disclosure described herein. Electronic device 500 presents uncropped first image preview 506a in landscape orientation via first GUI 508a on first display device 502a. Peripheral devices 510b-510c are provided but unattached or otherwise not wirelessly connected to electronic device 500.

Figure 5B:
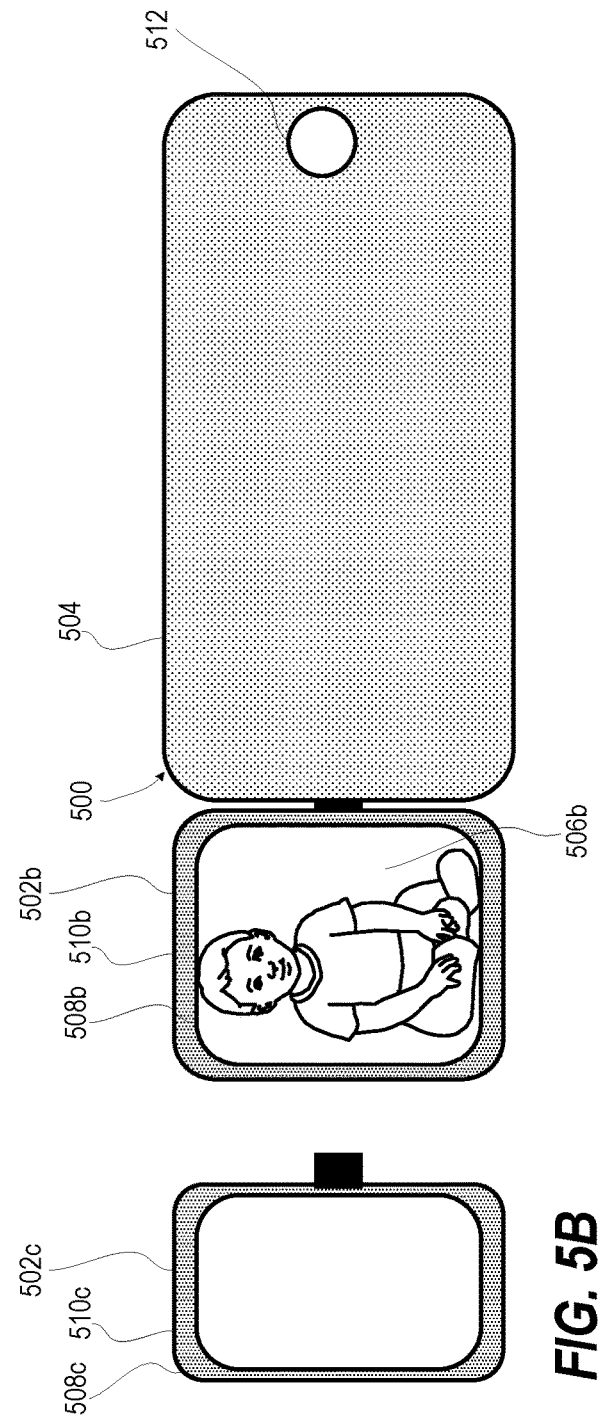
FIG. 5B depicts a back side view of the example electronic device of FIG. 5A with the peripheral device attached to present a cropped second image preview, according to one or more embodiments.

FIG. 5B depicts a back side view of example electronic device 500. Image capturing device 512 on a back side of housing 504 provides an image stream that is used by electronic device 500 for presenting first image preview 506a (FIG. 5A). In FIG. 5B, peripheral device 510 is attached to electronic device 500 to provide second display device 502b, which presents cropped second image preview 506b in portrait orientation via second GUI 508b. An alternate peripheral device 510c has alternate second display device 508c that has a different aspect ratio than second display device 508b of peripheral device 510b and first display device 508a of electronic device 500.

Figure 6:
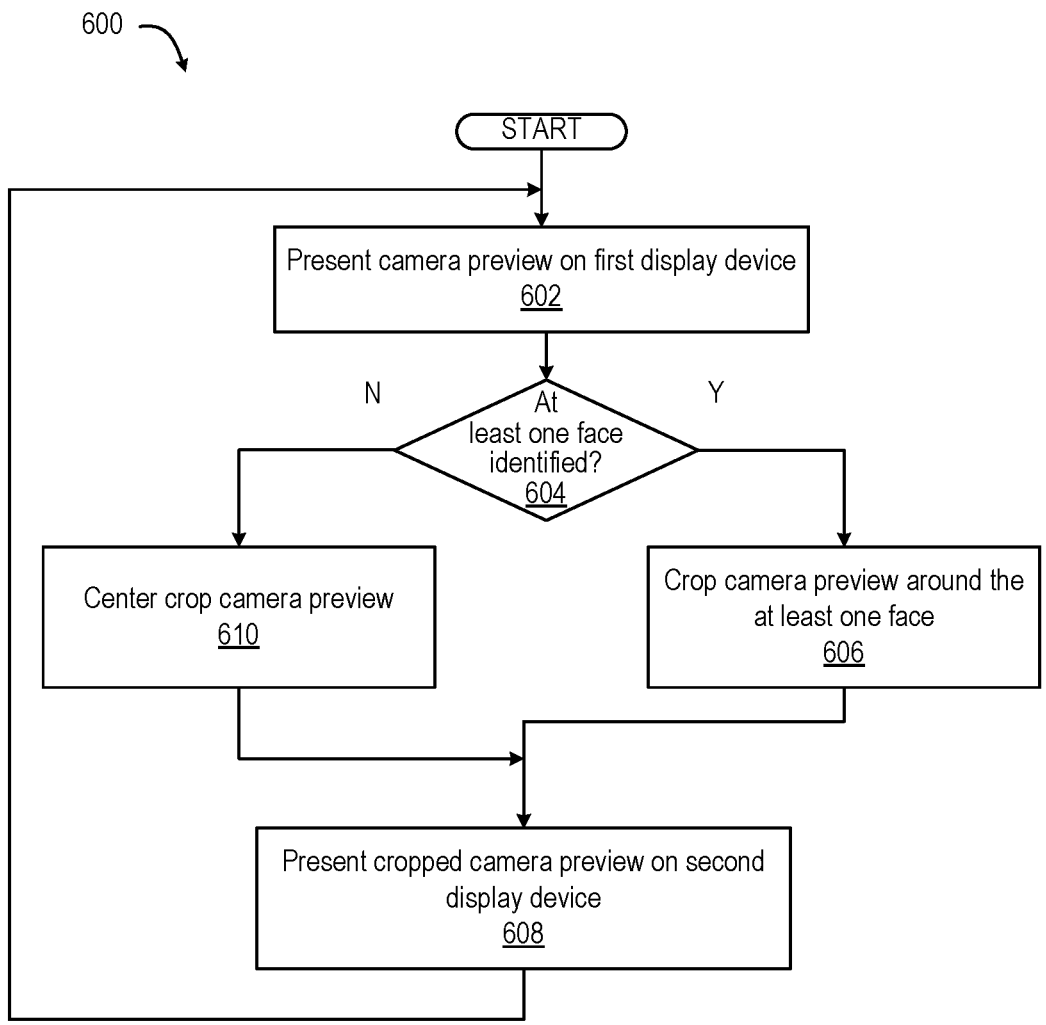
FIG. 6 presents a flow diagram of a method for cropping an image preview based on detecting a face in an image stream, according to one or more embodiments.

FIG. 6 presents a flow diagram of method 600 for cropping an image preview based on detecting a face in an image stream. The description of method 600 is provided with general reference to the specific components illustrated within the preceding FIGS. 1, 2, 3A-3C, 4A-4C, and 5A-5B. In at least one embodiment, electronic device 100, 300, 400, or 500 (FIGS. 1, 3A-3C, 4A-4C, and 5A-5B) or distributed system 200 (FIG. 2) performs method 600 using display devices 108a-108b and image capturing device 109b, managed by controller 101 (FIG. 1). Specific components described in method 600 can be identical or similar to specific components of the same name used to describe preceding FIGS. 1, 2, 3A-3C, 4A-4C, and 5A-5B. With reference to FIG. 6, method 600 includes presenting a first camera preview on a first display device (block 602). In one or more embodiments, the first image preview is an uncropped version of an image stream. Controller determines, in decision block 604, whether a face is identified in the camera preview. In response to identifying at least one face, method 600 includes cropping the first camera preview around the at least one face identified, to create a second cropped camera preview (block 606). Method 600 includes presenting the cropped camera preview on a second display device (block 608). Then method 600 returns to block 602. In response to not identifying a face, method 600 includes center-cropping the camera preview (block 610). Center-cropping means to find the center of the image and crop around the center. Then method 600 proceeds to block 608.

Figure 7A:
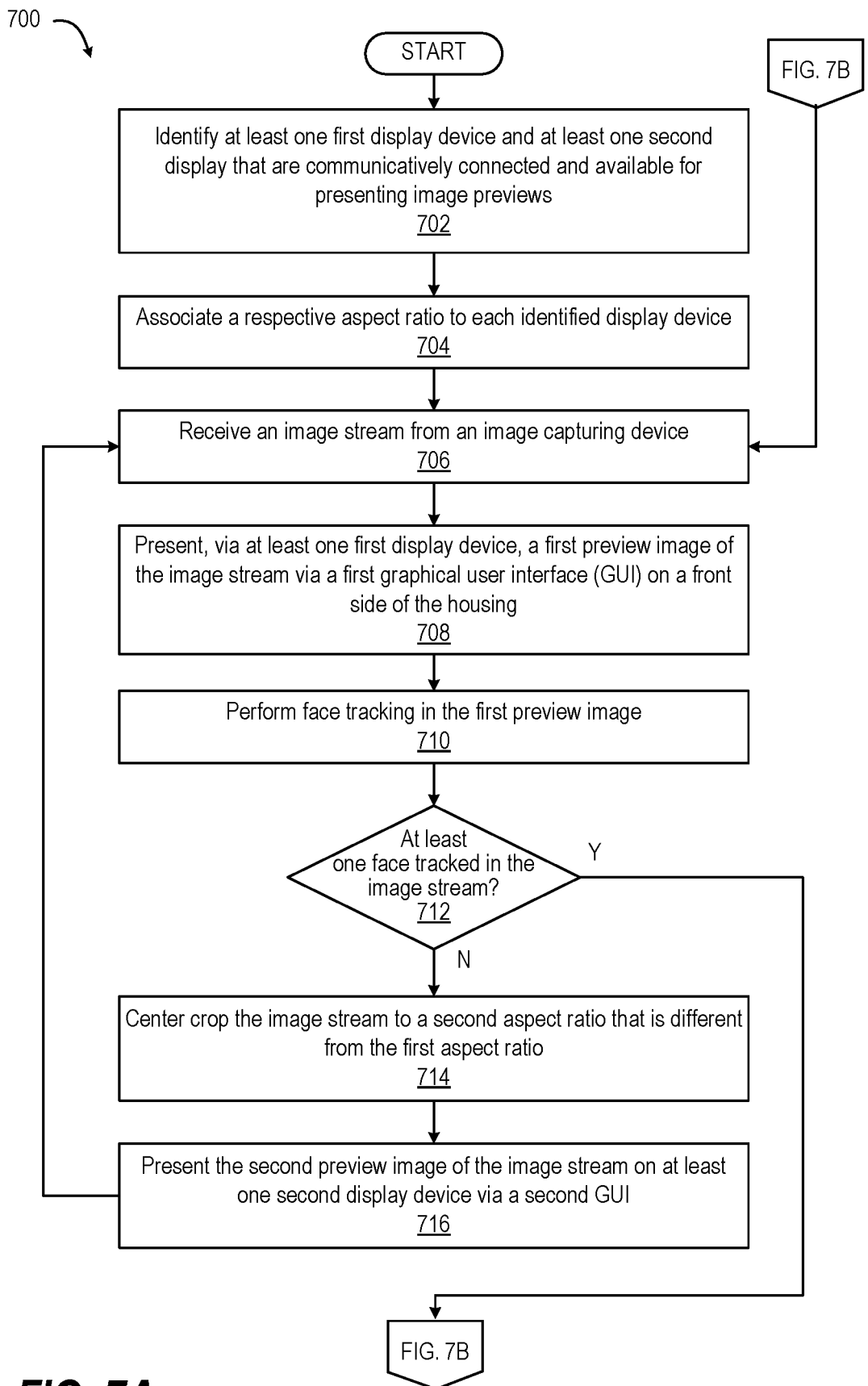
FIGS. 7A-7B (FIG. 7) present a flow diagram of a method for face tracking for a second device preview that assists a subject of an image capturing event, according to one or more embodiments.
Figure 7B:
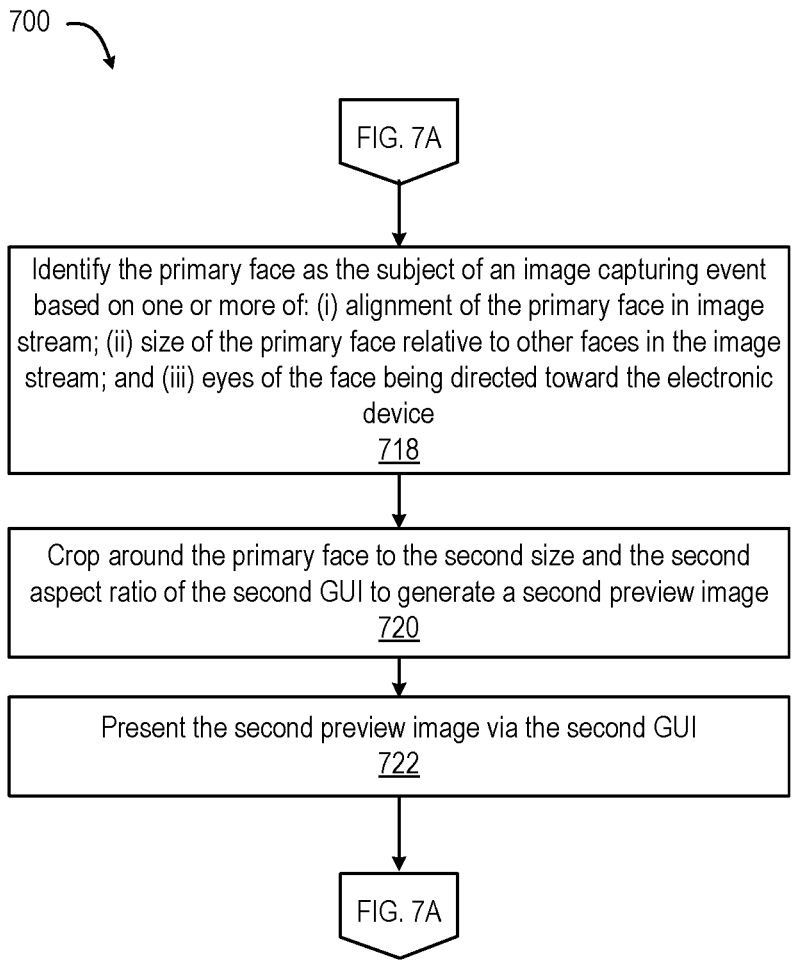

FIGS. 7A-7B (FIG. 7) present a flow diagram of method 700 for a controller of an electronic device to use a second display device for presenting an image preview. A first image preview presented by a first display is viewable by the user of the electronic device. In one or more embodiments, the second image preview presented on the second display can be viewed by a subject who is captured in the image preview. The subject is thus able to benefit from seeing his/her mirrored face in the second display. The subject can see whether or not their position, face and/or eye direction and other features, such as a smile, are posed properly. Face tracking is used to crop the second image preview so that the subject is provided a larger resulting image of an important feature of the main image preview. The subject is thus also able to infer useful information from the smaller second display. The description of method 700 is provided with general reference to the specific components illustrated within the preceding FIGS. 1, 2, 3A-3C, 4A-4C, 5A-5B, and 6. In at least one embodiment, electronic device 100, 300, 400, or 500 (FIGS. 1, 3A-3C, 4A-4C, and 5A-5B) or distributed system 200 (FIG. 2) performs method 700 using display devices 108a-108a and image capturing device 109b, managed by controller 101 (FIG. 1). Specific components described in method 700 can be identical or similar to specific components of the same name used to describe preceding FIGS. 1, 2, 3A-3C, 4A-4C, 5A-5B, and 6.

With reference to FIG. 7A, method 700 includes identifying at least one first display device and at least one second display device that are communicatively connected and available for presenting image previews (block 702). Method 700 includes retrieving and/or associating a respective aspect ratio to each identified display device (block 704). Method 700 includes receiving an image stream from an image capturing device (block 706). Method 700 includes presenting a first preview image of the image stream via a first graphical user interface (GUI) via at least one first display device on a front side of the housing (block 708). The first GUI has a first aspect ratio and a first size. Method 700 including performing face tracking in the first preview image (block 710). Method 700 includes determining, in decision block 712, whether the controller detects at least one face in the image stream. In response to not detecting at least one face, method 700 includes center cropping the image stream to a second aspect ratio that is different from the first aspect ratio (block 714). Method 700 includes presenting the second preview image of the image stream on at least one second display device via a second GUI (block 716). The second GUI has the second aspect ratio and has a second size. In one or more embodiments, the second size is an area is smaller than that of the first GUI. In one or more embodiments, the second size is larger than the first GUI. Then method 700 returns to block 706.

In response to determining that at least one face is detected in the image stream, method 700 includes identifying a primary face as the subject of an image capturing event based on one or more of: (i) alignment of the primary face in image stream; (ii) size of the primary face relative to other faces in the image stream; and (iii) eyes of the face being directed toward the electronic device (block 718). Method 700 includes cropping around the primary face to the second size and the second aspect ratio of the second GUI to generate a second preview image (block 720). Method 700 includes presenting the second preview image via the second GUI (block 722). Then method 700 returns to block 706.

In one or more embodiments, the housing of the electronic device includes a base housing and a movable housing that is positionably coupled to the base housing. The movable housing is movable between: (i) a closed position that hides the first GUI; and (ii) an open position exposes the first GUI. Method 700 includes enabling dual preview of the image stream in response at least in part to detecting the open position of the housing and an activation/connection of the at least one second display. For example, method 700 can be enabled by electronic device 300 (FIGS. 3A-3C) being open, or method 700 can be enabled by electronic device 400 (FIGS. 4A-4C) being closed.

In one or more embodiments, the at least one first display device and at least one second display device are portions of a single wraparound display, such as depicted for electronic device 400 (FIGS. 4A-4C). The single wraparound display has a front side portion on the front side of the housing that presents the first GUI and a back side portion on the back side of the housing that presents the second GUI. In one or more embodiments, in response to a user input, method 700 includes resizing the second image preview in the second GUI to include an uncropped entirety of the image stream.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   a housing having a front side and a back side;
   at least one first display device that presents a first graphical user interface (GUI) on the front side of the housing, the first GUI having a first aspect ratio and a first size;
   a second display device that presents a second GUI, the second GUI having a second aspect ratio that is different from the first aspect radio;
   an image capturing device;
   a controller communicatively coupled to the first and the second display devices and to the image capturing device, and which:
   receives an image stream from the image capturing device;
   presents, via the first GUI, a first preview image of the image stream;
   tracks an anatomical feature of a subject within the image stream; and
   presents, via the second GUI, a second preview image of the image stream that is cropped around the primary face to the second aspect ratio to compensate for different aspect ratio.

2. The electronic device of claim 1, wherein the second display device and the image capture device are located on the back side of the housing and presentation via the second GUI of a cropped image preview provides face tracking dual display preview with feedback of an image capturing event by the image capturing device.

3. The electronic device of claim 1, wherein the housing comprises:
   a base housing; and
   a movable housing positionably coupled to the base housing and movable between: (i) a closed position that hides at least a portion of the first GUI; and (ii) an open position that exposes the first GUI to enable the controller to provide the first preview of the image stream via the first display visible in the open position.

4. The electronic device of claim 1, wherein the at least one first display device and the second display device are portions of a single wraparound display having a front side portion on the front side of the housing that presents the first GUI and a back side portion on the back side of the housing that presents the second GUI.

5. The electronic device of claim 1, wherein:
   the second GUI has a second size that is smaller than the first GUI; and
   the controller presents, via the second GUI, the second preview image of the image stream that is cropped around the anatomical feature to the second aspect ratio to compensate for the smaller size and different aspect ratio.

6. The electronic device of claim 1, wherein the controller tracks the anatomical feature comprising a primary face of the subject.

7. The electronic device of claim 6, wherein the controller:
tracks more than one face in the image stream; and
identifies the primary face as the subject of an image capturing event based on one or more of: (i) alignment of the primary face in the image stream; (ii) size of the primary face relative to other faces in the image stream; and (iii) eyes of the primary face being directed toward the electronic device.

8. The electronic device of claim 1, wherein, in response to a user input, the controller resizes the second image preview in the second GUI to include an uncropped entirety of the image stream.

9. A method comprising:
receiving an image stream from an image capturing device;
presenting, via at least one first display device, a first preview image of the image stream via a first graphical user interface (GUI) on a front side of the housing, the first GUI having a first aspect ratio and a first size;
tracking, by a controller, an anatomical feature of a subject within the image stream; and
presenting a second preview image of the image stream on at least one second display device via a second GUI on the back side of the housing, the second GUI having a second aspect ratio that is different from the first aspect radio, the second preview image cropped around the primary face the second aspect ratio of the second GUI.

10. The method of claim 9, wherein the housing comprises a base housing and a movable housing positionably coupled to the base housing and movable between: (i) a closed position that hides the first GUI; and (ii) an open position exposes the first GUI, the method further comprising enabling dual preview of the image stream in response at least in part to detecting the open position of the housing and an activation/connection of the second display.

11. The method of claim 9, wherein the at least one first display device and at least one second display device are portions of a single wraparound display having a front side portion on the front side of the housing that presents the first GUI and a back side portion on the back side of the housing that presents the second GUI.

12. The method of claim 9, further comprising:
presenting the first preview image via the first GUI on a front side display device of the one or more display devices; and
presenting the second preview image via the second GUI on a peripheral device that is oriented with the back side of the electronic device.

13. The method of claim 9, wherein the second GUI has a second size that is smaller than the first GUI, the method further comprising presenting, via the second GUI, the second preview image of the image stream that is cropped around the anatomical feature to the second aspect ratio to compensate for the smaller size and different aspect ratio.

14. The method of claim 9, further comprising tracking the anatomical feature comprising a primary face of the subject.

15. The method of claim 14, further comprising:
tracking more than one face in the image stream; and
identifying the primary face as the subject of an image capturing event based on one or more of: (i) alignment of the primary face in image stream; (ii) size of the primary face relative to other faces in the image stream; and (iii) eyes of the face being directed toward the electronic device.

16. The method of claim 10, further comprising, in response to a user input, resizing the second image preview in the second GUI to include an uncropped entirety of the image stream.

17. A computer program product comprising:
a computer readable storage device; and
program code on the computer readable storage device that when executed by a processor associated with an electronic device, the program code enables the electronic device to provide the functionality of:
receiving an image stream from an image capturing device;
presenting, via at least one first display device, a first preview image of the image stream via a first graphical user interface (GUI) on a front side of the housing, the first GUI having a first aspect ratio and a first size;
tracking, by a controller, an anatomical feature of a subject within the image stream; and
presenting a second preview image of the image stream on at least one second display device via a second GUI on the back side of the housing, the second GUI having a second aspect ratio that is different from the first aspect radio, the second preview image cropped around the primary face the second aspect ratio of the second GUI.

18. The computer program product of claim 17, wherein the second GUI has a second size that is smaller than the first GUI, the program code enables the electronic device to provide the functionality of presenting, via the second GUI, the second preview image of the image stream that is cropped around the anatomical feature to the second aspect ratio to compensate for the smaller size and different aspect ratio.

19. The computer program product of claim 17, wherein the program code enables the electronic device to provide the functionality of tracking the anatomical feature comprising a primary face of the subject.

* * * * *